(12) United States Patent
Yan et al.

(10) Patent No.: US 11,716,748 B2
(45) Date of Patent: Aug. 1, 2023

(54) MULTI-USER SLICE RESOURCE ALLOCATION METHOD BASED ON COMPETITIVE GAME

(71) Applicant: WUHAN UNIVERSITY OF TECHNOLOGY, Hubei (CN)

(72) Inventors: Xin Yan, Hubei (CN); Huixian Xu, Hubei (CN); Ruijun Liu, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 0 days.

(21) Appl. No.: 17/797,049

(22) PCT Filed: Jun. 15, 2021

(86) PCT No.: PCT/CN2021/100188
§ 371 (c)(1),
(2) Date: Aug. 2, 2022

(87) PCT Pub. No.: WO2021/254349
PCT Pub. Date: Dec. 23, 2021

(65) Prior Publication Data
US 2023/0077176 A1    Mar. 9, 2023

(30) Foreign Application Priority Data
Jun. 15, 2020 (CN) .......................... 202010543434.1

(51) Int. Cl.
*H04W 24/02* (2009.01)
*H04W 72/53* (2023.01)

(52) U.S. Cl.
CPC .................................. *H04W 72/53* (2023.01)

(58) Field of Classification Search
CPC .................................................. H04W 72/53
See application file for complete search history.

(56) References Cited

U.S. PATENT DOCUMENTS

2014/0108474 A1   4/2014   David
2016/0253339 A1   9/2016   Ambrose
(Continued)

FOREIGN PATENT DOCUMENTS

CN        101127700 A       2/2008
CN        102076025 A       5/2011
(Continued)

OTHER PUBLICATIONS

Matteo Vincenzi et al., 'Maximizing Infrastructure Providers' Revenue Through Network Slicing in 5G', IEEE Access, vol. 7, 2019, published Sep. 9, 2019, pp. 128283-128297. (Year: 2019).*

(Continued)

*Primary Examiner* — Melvin C Marcelo
(74) *Attorney, Agent, or Firm* — Maine Cernota & Rardin

(57) ABSTRACT

The present disclosure provides a multi-user slice resource allocation method based on competitive game. In the method, first model a system as a two-tier architecture of virtual infrastructure service providers (VInPs) and users, and build a VInP utility model and a user utility model; then divide slice resource allocation into nodes and links, and build a node power consumption model and a link power consumption model, then determine a revenue of the VInP and a revenue of a user; and calculate a total revenue of a slice according to the revenue of the VInP and the revenue of the user, and use the total revenue of the slice as a network model; then solve the network model, where the VInP is used as a seller, the user is used as a buyer, the seller determines an initial price according to a total quantity of slice resources, and the buyer bids on the slice, and allocate the slice resources by using a competitive game mechanism. The method of the present disclosure may enhance the utility of the user, and improve a resource allocation effect.

9 Claims, 5 Drawing Sheets

(56) References Cited

U.S. PATENT DOCUMENTS

| | | |
|---|---|---|
| 2017/0164215 A1 | 6/2017 | Chen |
| 2017/0303259 A1 | 10/2017 | Lee |
| 2018/0124626 A1 | 5/2018 | Tsai |
| 2018/0317133 A1 | 11/2018 | Sciancalepore |
| 2020/0074181 A1 | 3/2020 | Chang |
| 2020/0170052 A1 | 5/2020 | Yang |

FOREIGN PATENT DOCUMENTS

| | | |
|---|---|---|
| CN | 103826306 A | 5/2014 |
| CN | 104348695 A | 2/2015 |
| CN | 105915304 A | 8/2016 |
| CN | 106714093 A | 5/2017 |
| CN | 108111931 A | 6/2018 |
| CN | 109121105 A | 1/2019 |
| CN | 109195186 A | 1/2019 |
| CN | 109857546 A | 6/2019 |
| CN | 110111189 A | 8/2019 |
| CN | 110351608 A | 10/2019 |
| CN | 111742525 A | 10/2020 |
| CN | 111757354 A | 10/2020 |
| EP | 2863674 A4 | 2/2016 |

OTHER PUBLICATIONS

First Search for CN Patent Appl. No. CN202010543434.1 dated May 13, 2021, 3 pages.

First Office Action for CN Patent Appl. No. CN202010543434.1 dated May 20, 2021, 7 pages.

Supplementary Search for CN Patent Appl. No. CN202010543434.1 dated Jun. 2, 2021, 1 page.

Notification to Grant Patent Right for Invention for CN Appl. No. CN202010543434.1 dated Jun. 22, 2021, 3 page.

International Search Report and Written Opinion for PCT Appl. No. PCT/CN2021/100188 dated Sep. 13, 2021, 9 pages.

International Search Report and Written Opinion with English translation for PCT Appl. No. PCT/CN2021/100188 dated Sep. 13, 2021, 13 pages.

\* cited by examiner

MULTI-USER SLICE RESOURCE ALLOCATION METHOD BASED ON COMPETITIVE GAME

CROSS REFERENCE TO RELATED APPLICATION

This patent application is a national stage application of International Application No. PCT/CN2021/100188, filed on Jun. 15, 2021, which claims priority to the Chinese Patent Application No. 202010543434.1, filed with the China National Intellectual Property Administration (CNIPA) on Jun. 15, 2020, and entitled "MULTI-USER SLICE RESOURCE ALLOCATION METHOD BASED ON COMPETITIVE GAME". Both of the aforementioned applications are incorporated by reference herein in their entireties for all purposes.

TECHNICAL FIELD

The present disclosure relates to the technical field of computer, and in particular to a multi-user slice resource allocation method based on competitive game.

BACKGROUND ART

With the development of science and technology, great changes have taken place in people's production and lifestyle, and especially the development of communication technology has promoted earth-shaking changes in human society. Computer networks reduce people's geographical restrictions infinitely, allow many industries to be shifted from offline to online, such as online courses, video conferences, smart healthcare, industrial Internet, and the like, thereby promoting the development of all walks of life. In the future, with the development of communication theory and technology, computer networks will promote the social development and improve people's lives in an unprecedented manner.

At the beginning of the rise of networks, wired networks were used for data transmission all the time. Wired networks have relatively high stability, reliability, and data transmission rate, and thus are widely used in military and commercial fields. However, defects such as high infrastructure deployment costs, difficult maintenance, low resource utilization, and geographical restrictions of wired networks are also gradually emerging. In recent years, due to the development of wireless network technology, wireless networks are becoming more and more popular, breaking the geographical restrictions of the traditional wired networks and becoming a mainstream direction of current network development. From 1G and 2G that only support voice and text services to 3G and 4G that have been applied commercially in supporting video services, an amount of data transmitted over wireless networks has shown an explosive growth, and it has been more and more difficult for the existing mobile communication systems to meet people's demands. Therefore, a commercial application of the 5G network technology has been put on the agenda. The 5G networks have put forward higher requirements for various performances of data transmission, including low latency, high bandwidth, high reliability, and the like. The network slicing, as a key technology of 5G networks, is significant to study management and allocation of network slice resources, while the cloud radio access network (C-RAN), as a new wireless network access architecture, has been a key architecture of 5G networks due to its features such as strong scalability, centralized deployment of resources, and low latency. Therefore, with limited resources, management and allocation of network slice resources and provision of efficient network services have important practical and guiding significance, which are mainly reflected in the following aspects.

(1) Various emerging industries have put forward increasingly higher requirements for network performances, including low latency, high bandwidth, high reliability, and the like. The traditional best-effort model has been unable to meet the demands of users, and it is significant for users to strengthen the management of network resources.

(2) Due to the increase in application types and the rapid growth in the number of users, network operators try to meet the demands of users by increasing the deployment of base stations, however, which has led to the resource utilization reduced. Strengthening the management of network resources can reduce the network costs and improve the resource utilization.

(3) A dense network deployment architecture causes serious inter-cell interference, and strengthening management of network resources to avoid or reduce inter-cell signal interference has been a hot spot of current research.

(4) In view of scarce spectrum resources, sharing spectrum resources is significant to the management of network resources.

The C-RAN architecture is a new network architecture on the access network side, in which some BaseBand Units (BBU) are centralized to form a BaseBand Unit pool (BBU Pool), and then are subjected to a unified management and allocation. "C" in C-RAN mainly has four meanings: centralized, cooperative radio, real-time cloud infrastructure, and clean. The C-RAN may effectively reduce the costs of device deployment, realize the dynamic scheduling of network resources, and provide a low-cost, easy-to-extend, high-bandwidth wireless network architecture, which has broad significance in both application and research fields. The C-RAN has the following advantages:

(1) The C-RAN is an environment-friendly, clean and energy-saving network infrastructure. Through centralized processing on BBU, the C-RAN greatly reduces a number of base stations, network construction costs, and the electricity consumption of site-supported devices, thereby reducing network energy consumption. The development of cooperative radio technology has effectively solved the problem of interference among Remote Radio Heads (RRHs), greatly increasing the deployment density of RRHs, and reducing the energy consumption of data transmission.

(2) The C-RAN has improved a capacity of a network. Centralized management of the BBUs in C-RAN forms the BBU pool, and the virtual base stations may share the signals and traffic of all users in the network, thereby improving the utilization efficiency of a spectrum resource.

(3) The C-RAN has improved a load balancing capacity of the network. The C-RAN may adaptively handle the non-uniform traffic of users. A BBU resource pool performs centralized processing on traffic within a coverage area thereof, which can meet the non-uniform traffic demands of users.

(4) Millimeter-wave band technology has gained development in the C-RAN. A corresponding spectrum is required for guaranteeing a high network capacity and a high data transmission rate in the 5G slice network. Due to the lack of spectrum resources in low frequency bands, new spectrum resources need to be developed to meet the demands of users. The millimeter wave technology can integrate MIMO technology to achieve the multi-carrier constraint, thereby greatly improving the utilization efficiency of spectrum.

In the process of implementing the present disclosure, the inventor of this application found that the C-RAN architecture has great advantages over the traditional network architectures. However, there are some challenges in management and allocation of network slice resources under the C-RAN architecture, which are mainly manifested in the following aspects:

There is a specific relationship between the estimated value of a network slice given by a user and the value of the network slice itself, which is difficult to be reflected in the existing model. This imposes a higher challenge for users in reasonably allocating network slice resources. In addition, the resource management and allocation of network slicing are often directed to single-user multi-operator situations, with a little study of multi-user multi-operator scenarios.

It can be seen that the method in the prior art has a technical problem that it is difficult to guarantee an effect for multi-user resource allocation.

SUMMARY

An object of the present disclosure is to provide a multi-user slice resource allocation method based on competitive game, so as to solve or at least partially solve the technical problem of a poor allocation effect in the prior art.

To solve the foregoing technical problems, the present disclosure discloses a multi-user slice resource allocation method based on competitive game, including:

S1: modeling a system as a two-tier architecture of virtual infrastructure service providers (VInPs) and users, where a VInP layer comprises a plurality of VInPs, and a user layer comprises a plurality of users;

S2: building a VInP utility model and a user utility model;

S3: dividing the slice resource allocation into nodes and links, and building a node power consumption model and a link power consumption model;

S4: determining a revenue of the VInP according to the VInP utility model, the node power consumption model, and the link power consumption model, and determining a revenue of a user according to the user utility model, the node power consumption model, and the link power consumption model;

S5: calculating a total revenue of a slice according to the revenues of the VInP and the user, and using the total revenue of the slice as a network model; and S6: solving the network model, where the VInP is used as a seller, the user is used as a buyer, the seller determines an initial price according to a total quantity of slice resources, and the buyer bids on the slice, and allocating the slice resources by using a competitive game mechanism.

In some implementations, building a VInP utility model in S2 is:

$$G(p,q)=pq-cq, \quad (1)$$

where p represents an initial unit price of the slice resources given by the VInP, q represents a quantity of slice resources allocated by the VInP, and c represents a cost unit price of the slice resources; the user utility model is:

$$F(p,q)=u(q)-l(p,q)+v(q), \quad (2)$$

where u(q) represents the utility generated from the slice resources acquired by a user, l(p,q) represents a cost expended by the user for the resource, v(q) represents the user satisfaction, $u(q)=w\ln(1+q)$, $l(p, q)=pq$, $$v(q) = \ln\left(\frac{m+q}{m}\right),$$

where w is a constant greater than 0 and represents a user weight; where m represents a quantity of resources requested by the user.

In some implementations, building a node power consumption model in S3 specifically includes:
calculating the power consumption of a single node:

$$P_i=P_i^{SE}+P_i^{RE}, \quad (3)$$

where P represents the link power consumption of a accessed node i in a slice, $P_i^{SE}$ represents the transmission power consumption of the accessed node i, and $P_i^{RE}$ represents the reception power consumption of the accessed node i. Calculating the node power consumption of the slice according to the power consumption of the single node:

$$p_i^s = \sum_{l \in \Theta} h_{i,l}^s p_i, \quad (4)$$

where $h_{i,l}^s$ represents whether the node i is used in a path l, the path represents a complete link from a source node to a destination node, and s represents a label of the slice; determining a node price $\rho_i(p_i^s)$ according to the node power consumption of the slice, where the node price is a function of the node power consumption, and $\rho_i(p_i^s)$ is used as the node power consumption model.

In some implementations, building a link power consumption model in S3 specifically includes:
calculating a bandwidth of a link e:

$$x_e^s = \sum_{l \in \Psi} y_l^s = \sum_{l \in \Theta} g_{e,l}^s y_l^s, \quad (5)$$

where a network controller calculates $L_s$ candidate paths from the source node to the destination node that meet user demands. The paths from the source node to the destination node are denoted by $\Psi$ and amount to O paths in total. The candidate paths denoted by $\Theta$ are included in all paths from the source node to the destination node, namely, $\Theta \subseteq \Psi$, $\Psi=\{l_1, l_2, \ldots, l_{L_s}, \ldots, l_O\}$. $y_l^s$ represents bandwidth allocation on a path l, and $g_{e,l}^s$ represents whether a link e is used in the path l of a slice s. The methods for calculating the candidate paths includes: 1) by using a primal-dual algorithm starting from any feasible flow in a network with a flow value (also known as available bandwidth) x≤v, increasing the flow values of link in the network and modify potentials of nodes; 2) iterating the links and the nodes in the network until a flow that meets a predetermined constraint condition is obtained, to obtain a target candidate path, namely, bandwidth allocation of the link. Herein v represents a flow value requested by the user, namely, a requested data transmission rate. If an initial flow value is greater than v, the target candidate path is directly obtained. A link price $\rho_e(x_e^s)$ is calculated according to the bandwidth of the link e, which is a function of the link bandwidth and is used as the link power consumption model.

In some implementations, determining a revenue of the VInP according to the VInP utility model, the node power consumption model, and the link power consumption model in S4 includes:

determining the utility obtained by the VInP for a slice s:

$$Q_p^s(x^s, p^s) = \phi_s(x^s, p^s, \rho)r - \left(\sum_{l \in \Theta} \varphi_i(p_i^s)h_{i,l}^s + \sum_{l \in \Theta} \varphi_e(x_e^s)g_{e,l}^s\right)r, \quad (6)$$

where $\phi_s(x^s,p^s,\rho)r$ represents a charge for the slice s provided by the VInP and, $$\left(\sum_{l \in \Theta} \varphi_i(p_i^s)h_{i,l}^s + \sum_{l \in \Theta} \varphi_e(x_e^s)g_{e,l}^s\right)r$$

represents a cost for providing a service. $\varphi_i(p_i)$ represents the price of node i and $\varphi_e(x_e^s)$ represents the price of link e. $\varphi(\cdot)$ is a monotonically increasing function. $h_{i,l}^s$ represents whether the node i is used in path l and $g_{e,l}^s$ represents whether the link e is used in path l. The revenue of the VInP is determined by the utility obtained by the VInP for the slice s:

$$Q_P = \Sigma_{s \in S} Q_p^s(x^s, p^s), \quad (7)$$

where a server has the largest profit, i.e., the following conditions are met:

$$\max Q_p^s(x^s, p^s),$$

$$s.t.: x_e^s \leq c_e^{pro},$$

$$p_i^s \leq v_i^{pro},$$

where $x_e^s$ represents the bandwidth of link e and $c_e^{pro}$ represents the remaining maximum bandwidth available for an allocation provided by the link e. $p_i^s$ represents the power consumption of node i in the slice s, and $v_i^{pro}$ represents the remaining maximum data transmission rate provided and supported by the node i.

In some implementations, determining a revenue of a user according to the user utility model, the node power consumption model, and the link power consumption model in S4 includes:

determining the utility of each user:

$$U_s(r) = w_s \log(l+r), \quad (8)$$

where $w_s$ represents the service quality request level of the user, and r represents the data transmission rate;

determining the cost of the user for building the slice according to the node power consumption model and the link power consumption model:

$$\phi_s(x^s, p^s, \rho) = \sum_{e \in \xi_s} \rho_e(x_e^s) + \sum_{i \in N_s} \rho_i(x_i^s), \quad (9)$$

where $x_e^s$ represents a link allocation and $p_l^s$ represents a node allocation status, $\rho_e(\cdot)$ represents the functional relationship between a link unit price and a link allocation bandwidth, $\rho_i(\cdot)$ represents the relationship between a node unit price and the node power consumption, $$\sum_{e \in \xi_s} \rho_e(x_e^s)$$

represents a cost paid by the user for purchasing the link, $$\sum_{i \in N_s} \rho_i(x_i^s)$$

represents a cost paid by the user for purchasing the node;

determining the revenue of the user according to the utility and cost of the user for building the slice, namely, the total revenue of the user for purchasing all slices:

$$Q_c = \Sigma_{s \in S} Q_c^s, \quad (10)$$

where the expression above is maximized:

$$\max Q_c^s = \sum_{f \in K_s} U_s(r_f) - \phi_s(x^s, p^s, \rho)r,$$

$$s.t.: x_e^s \geq c_e^{req}, p_i^s \geq v_i^{req},$$

where $Q_c^s$ represents the revenue from the slice s purchased by the user, S represents a set of slices, $r_f$ represents the data transmission rate requested by a user f, the expression following s.t. represents the constraint condition, $x_e^s$ represents the bandwidth of link e, $c_e^{req}$ represents the bandwidth requested by the user, $p_i^s$ represents the power consumption of node i in the slice s, and $v_i^{req}$ represents the node data transmission rate requested by the user.

In some implementations, S5 specifically includes:
calculating the total revenue of the slice according to the revenue of the VInP and the revenue of the user:

$$\max Q^s = \quad (11)$$

$$\max (Q_c^s + Q_p^s) =$$

$$\max \left(\sum_{f \in K_s} w_s \log\left(1 + \sum_{l \in \Theta} q_{f,l}^s y_l^s\right) - \left(\sum_{l \in \Theta} \varphi_i(p_i^s)h_{i,j}^s + \sum_{l \in \Theta} \varphi_e(x_e^s)g_{e,l}^s\right)r\right),$$

$$s.t.: x_e^s \geq c_e^{req}, p_i^s \geq v_i^{req}, x_e^s \leq c_e^{pro}, p_i^s \leq v_i^{pro},$$

where the constraint condition consists of the constraint on the user requesting a node or a link, and the constraint on a VInP end responding to a node or bandwidth constraint.

In some implementations, when the competitive game mechanism is used to allocate the slice resources in S6, a mutual information-based competitive game strategy is adopted, and the revenue of the user is used as an estimated value of the user for the slice, the revenue of the VInP is used as an estimated value for the slice, an estimated value a of the user for the slice is used as a random variable, a value of the slice is also a random variable p, there is a specific relationship between a and p, and I(a,p) represents a degree of correlation between the estimated value for the slice and the value of the slice.

The foregoing one or more technical solutions in the embodiments of this application have at least one or more of the following technical effects.

Aiming at a multi-user network slice resource allocation method, the present disclosure models the network slice resource allocation as a two-tier architecture being composed of a virtual infrastructure service provider (VInP) and a user, and the VInP and the user establish the utility models thereof. A marginal benefit of economics is used to build a revenue model for the user, and the user satisfaction is modeled by considering the relationship between the resources requested by the user and the actual allocated resources. A cooperative competition mechanism is used to adjust the resource price and the amount of allocated resources, such that a Nash equilibrium is finally reached. Compared to other game strategies, the utility of the user has been improved; for a situation where a plurality of users request the same network slice resource, the node energy consumption and the link selection play an important role in the slice resource allocation. The slice is modeled as a combination of nodes and links, the plurality of users bid on the slice, and the competitive game strategy is used to allocate the slice resources to the users to improve the allocation effect of the slice resources.

Furthermore, it is proposed to use the mutual information to reflect the relationship between an estimated value and a real value, and a slice resource allocation scheme is obtained by adjusting a bidding strategy. Finally, the utilization rate of node and link resources in the scheme is proved to be improved through experiments, and the introduction of mutual information enables the system to reach a Nash equilibrium earlier and improves its network benefits.

BRIEF DESCRIPTION OF THE DRAWINGS

The present disclosure will be explained in detail with reference to the accompanying drawings.

DETAILED DESCRIPTION OF THE EMBODIMENTS

Figure 1:
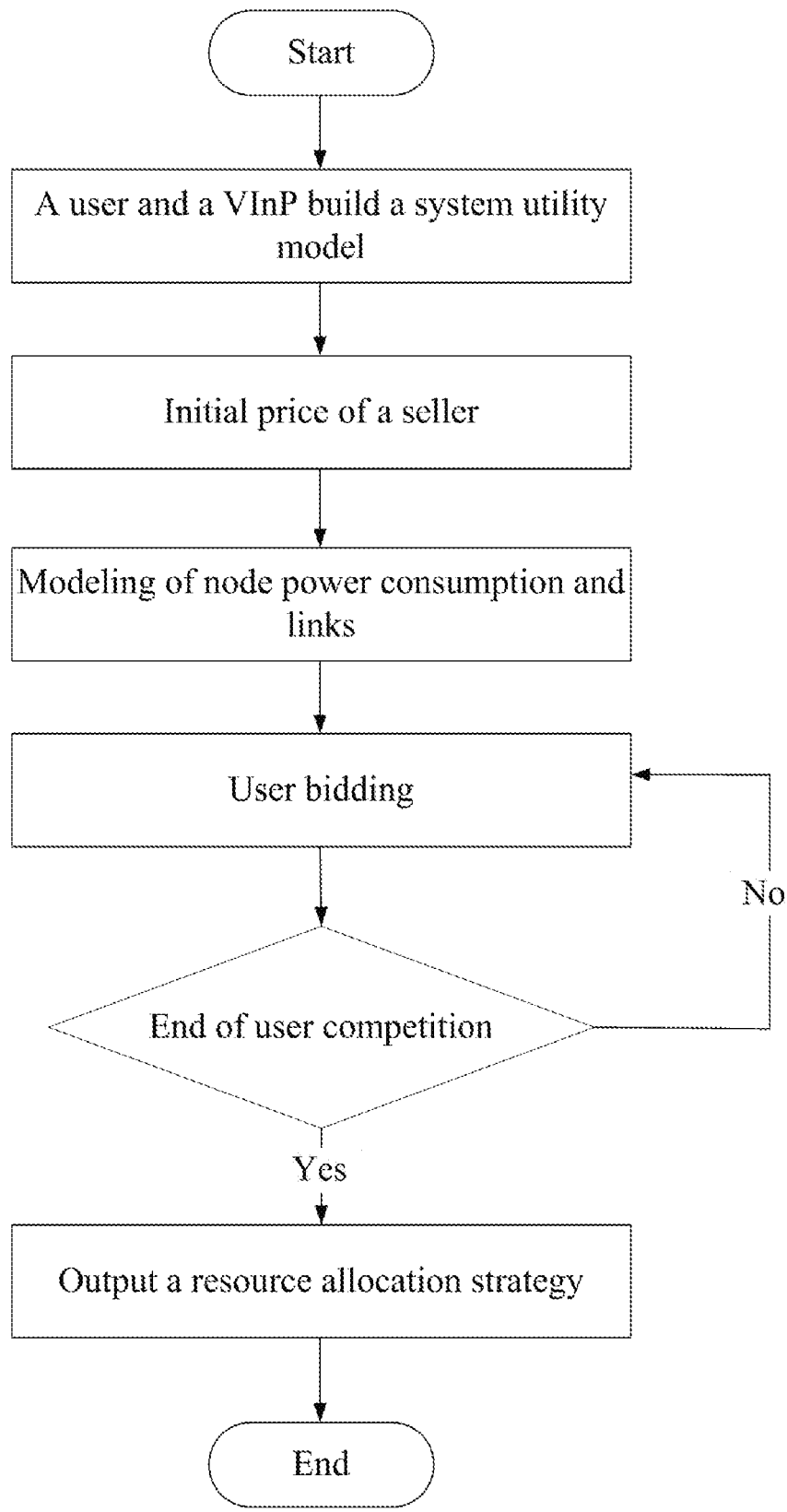
FIG. 1 is an overall flowchart of a multi-user slice resource allocation method based on competitive game according to the present disclosure.

The present disclosure proposes a multi-user slice resource allocation method based on competitive game theory, which may be used for multi-user slice resource allocation and improves an allocation effect.

In order to achieve the foregoing objectives, the present disclosure employs the following technical solutions:

1. Research on a multi-user multi-VInP scenario.

A user satisfaction-based network slice resource allocation and management method under a C-RAN architecture is proposed. The network slice resource allocation is modeled as a two-tier architecture consisting of VInPs and users. While building a user utility model, a manner for quantizing user satisfaction on allocated resources is proposed to maximize a utility function of users.

2. Considering the influences of nodes and links on networks, a mutual information-based network slice resource allocation and management model under a C-RAN architecture is built. Based on the relationship between a value of a slice estimated by a user who competes for network slice resources and a value of a slice, a mutual information-based network slice resource management scheme is proposed.

In order to make the objectives, technical solutions and advantages of embodiments of the present disclosure more clear, the technical solutions in the embodiments of the present disclosure will be clearly and completely described below in conjunction with the accompanying drawings in the embodiments of the present disclosure. Apparently, the embodiments as described are some, instead of all the embodiments of the present disclosure. All other examples obtained by a person of ordinary skill in the art based on the embodiments of the present disclosure without creative efforts shall fall within the protection scope of the present disclosure.

This embodiment provides a multi-user slice resource allocation method based on a competitive game, and the method includes steps S1 to S6.

In step S1, a system is modeled as a two-tier architecture of virtual infrastructure service providers (VInPs) and users, where a VInP layer comprises a plurality of VInPs and a user layer comprises a plurality of users.

In step S2, a VInP utility model and a user utility model are built.

In step S3, slice resources are divided into the nodes and links for allocation, and a node power consumption model and a link power consumption model are built.

In step S4, the revenue of each VInP is determined according to the VInP utility model, the node power consumption model, and the link power consumption model, and the revenue of each user is determined according to the user utility model, the node power consumption model, and the link power consumption model.

In step S5, the total revenue of a slice is calculated according to the revenue of the VInP and the revenue of the user, and the total revenue of the slice is used as a network model.

In step S6, the network model is solved, where the VInP is used as a seller, the user is used as a buyer, the seller determines an initial price according to a total quantity of slice resources, and the buyer bids on slices, and the slice resources are allocated by using a competitive game mechanism.

Specifically, network resources are sliced under the C-RAN architecture, a physical network is mapped into a virtual network with specific functions, and spectrum resources of network slices are allocated so that a benefit of the network is maximized. The system is modeled as a two-tier architecture composed of multiple virtual infrastructure service providers (VInPs) and multiple users. As a limited resource pool, a VInP is an owner of network slices. The VInP makes a pricing strategy based on market information with a goal of maximizing its own benefit. A user applies for a specific quantity of resources to an upper layer according to a network status and its own needs, so as to meet its own needs. The VInP layer wishes to use the limited resources to obtain a maximum revenue, while a lower user layer wishes to obtain a maximum quantity of resources at the lowest cost. Therefore, the upper and lower layers experience a game process, and finally the system reaches a Nash equilibrium.

Referring to FIG. 1, FIG. 1 is an overall flowchart of a multi-user slice resource allocation method based on a competitive game. As shown in FIG. 1, at the beginning stage, for users and VInPs, their utility models are established respectively. There is an initial price for any network slice resources, namely, the more a total quantity of the network resources is, the lower the initial price is. Then node power consumption and link power consumption are modeled to obtain network slices composed of nodes and links, and finally, the node model and the link model are solved to obtain a quantity of network slices requested by a user, namely, the quantity of resources. A final network slice resource allocation scheme is solved by the network model (also called "an auctioneer").

In an embodiment, a VInP utility model in step S2 is built as follows:

$$G(p,q)=pq-cq, \quad (1)$$

where p represents an initial unit price of slice resources given by the VInP, q represents a quantity of slice resources allocated by the VInP, and c represents a unit cost of the slice resources.

A user utility model is expressed as:

$$F(p,q)=u(q)-l(p,q)+v(q), \quad (2)$$

where u(q) represents a utility generated from the slice resources acquired by a user. l(p,q) represents a cost expended by the user for resources. v(q) represents the user satisfaction. u(q)=wln(1+q), l(p,q)=pq, where w represents a user weight and is a constant greater than 0.

$$v(q) = \ln\left(\frac{m+q}{m}\right),$$

wherein m represents a quantity of resources requested by the user.

Specifically, for a slice s (s∈S), it is supposed that there are a total of n users and m VInPs. The quantity of resources requested by the $i^{th}$ user is $m_i$, which is an ideal resource allocation quantity. The quantity of allocated resources provided by the $j^{th}$ VInP is $q_j$, and $q_j<m_i$. Generally, the quantity of resources requested by a user is always greater than the quantity of resources allocated by a VInP. The total quantity of resources that the $j^{th}$ VInP can allocate to a user is $Q_j$, and $q_j<Q_j$, that is to say, the quantity of allocated resources is less than the total quantity of resources. A resource unit price provided by the $j^{th}$ VInP is $p_j$, and the resource unit price is related to the total quantity of resources, which may be expressed as:

$$p_j = \frac{b}{Q_j}, \quad (12)$$

where b is a constant, and when a user selects a VInP for trading, the resource unit price and the quantity of resources need to be considered. The lower the resource unit price is, the higher the user utility is. The smaller the difference between the quantity of requested resources and the quantity of resources that can be allocated by the VInP is, and the higher the user satisfaction is. Therefore, a VInP selected by the $i^{th}$ user for trading may be expressed as:

$$j = \arg\min_j\left((m_i - q_j) \times \frac{b}{Q_j}\right), \quad (13)$$

then the optimal price strategy is obtained through collaborative competition with the $j^{th}$ VInP, namely, the optimal price of slice s for user i is obtained.

For the convenience of research, a price cooperative competition scenario between the $j^{th}$ VInP and the $i^{th}$ user is discussed below. In the process of cooperative competition, the resource price and the quantity of allocated resources are changed, and a Nash equilibrium is reached finally. The initial unit price of resources given by VInP is p, and the quantity of resources allocated by VInP is q. The quantity of resources requested by user is m, and q<m. The initial price is related to the total quantity of resources. The larger the total quantity of resources is, the lower the initial price is, i.e.:

$$p = \frac{b}{Q}, \quad (14)$$

where b is a constant greater than 0.

Therefore, the utility model of VInP reflects the difference between a resource price and a resource cost, as shown in Eq. (1).

Considering the influence of user satisfaction on utility function, the utility function of a user includes three parts: the utility generated from the acquired resources, the resource expenditure cost, and the user satisfaction. The utility generated from the acquired resources is expressed by u(x), representing the revenue brought by allocating x resources. The present disclosure adopts a conservative utility function, namely, a logarithmic function, as the utility function of resources, which is expressed as:

$$u(q)=wln(1+q), \quad (15)$$

where w is a constant greater than 0, representing a user weight. The meaning of utility function is that the specific quantity of resources allocated to a user can basically meet the demands of the user, but when the quantity of allocated resources is large enough, the growth rate of user revenue may decrease with the increase of the allocated resources. The resource expenditure cost of user is the product of resource unit price and the quantity of allocated resources, which may be expressed as:

$$l(p,q)=pq. \quad (16)$$

User satisfaction is the perceptual knowledge of user for a resource allocation scheme. The present disclosure quantifies user satisfaction, and it may be expressed by the quantity of resources requested by a user and the quantity of resources allocated by VInP to the user:

$$v(q) = \ln\left(\frac{m+q}{m}\right). \quad (17)$$

As the quantity of allocated resources increases, user experience will be better, and user satisfaction will increase. When the quantity of allocated resources decreases, user satisfaction also gradually decreases, and when the quantity of resources allocated to a user is 0, the user satisfaction is also 0. Therefore, the total revenue of the resources requested by a user is F(p,q), which may be expressed in the form of Eq. (2).

For a system model, it is necessary to build utility models for users and VInPs respectively, and a system utility model is obtained by analyzing the utility models built for users and VInPs respectively. The user adjusts a quantity of purchased resources according to a price strategy of the VInP to optimize a utility function thereof, while the VInP adjusts a resource price according to the quantity of resources purchased by the user to optimize a resource utility function thereof. And this process is repeated to finally reach a Nash equilibrium. An extremely high price set by the VInP may cause excessive resources to be idle, resulting in a waste of resources, while an extremely low price may cause a very large load for an entire network, affecting the user experience performance. Therefore, in the game process, it is desirable to formulate a reasonable price and quantity of purchased resources, such that both VInP and user can meet demands thereof.

In the implementation, building a node power consumption model in step S3 specifically includes:

calculating a power consumption of a single node:

$$P_i = P_i^{SE} + P_i^{RE}, \quad (3)$$

where $P_i$ represents the link power consumption of an accessed node i in a slice, $P_i^{SE}$ represents the transmission power consumption of the accessed node i, and $P_i^{SE}$ represents the reception power consumption of the accessed node i;

calculating the power consumption of all nodes in one slice according to the power consumption of single node:

$$p_i^s = \Sigma h_{i,l}^s p_i, \quad (4)$$

where $h_{i,l}^s$ represents whether a path l passes through node i, the path represents a complete link from a source node to a destination node, and s represents the label of a slice; one slice may include a plurality of nodes, and Eq. (4) represents total node power consumption in one slice, which is a sum of the power consumption of a plurality of nodes;

determining a node price $\rho_i(p_i^s)$ according to total node power consumption of slice s, where the node price is a function of total node power consumption, and $\rho_i(p_i^s)$ is used as a node power consumption model.

Specifically, for network slice resources, the node energy consumption and selection of links play a leading role in slice resource allocation. Nodes and links are used as the underlying infrastructure of a network, and the node energy consumption and selection of links is of great significance for building a network slice that meets demands of user. To allocate network slice resources under the C-RAN architecture, both nodes and links are modeled. A network controller manages an underlying network through network function virtualization (NFV) and software defined networking (SDN), maps a physical network to a virtual network, and forms a network slice with specific functions, which may be represented by an ordered combination of nodes and links. Various slices are logically isolated from each other, and physically share the underlying infrastructure. The underlying network may be expressed as a directed graph $G(N,\xi)$, where $N=\{i|i=1, 2, \ldots, N\}$ represents a set of nodes, and $\xi=\{e|e=1, 2, \ldots L\}$ represents a set of links. For a request of user, slices are established based on a slice matching principle. A set of slices may be expressed as $S=\{s|s=1, 2, \ldots n\}$, where n represents a number of slices. One slice may meet the demands of a single user or a plurality of users. Therefore, a plurality of users may compete for a same slice resource.

The energy consumption of each node plays an important role in establishing a slice. The selection of nodes not only needs to meet a service quality request of user but also needs to minimize the power consumption of the network system. According to Shannon formula, a transmission rate of node i may be expressed as:

$$u_i = B_i \log_2\left(1 + \frac{p_i^{se} h_i}{\sigma^2}\right), \quad (18)$$

where $p_i^{se}$ represents the data transmission rate of node, $B_i$ represents the bandwidth allocated to node i, $h_i$ represents the channel gain of node i, and $\sigma^2$ represents a channel noise power. Therefore, the selection of candidate nodes needs to meet $p_i^{se} \geq p_i^{req}$, and $p_i^{req}$ represents the transmission rate requested by user.

Overall power consumption of system is mainly divided into two parts: the power consumed by node to send data, and the power consumed by node to receive data. When the $i^{th}$ node is accessed, $1 \leq i \leq n$, and the power consumption of a single node may be modeled as the form of Eq. (3).

The transmission power consumption $p_i^{SE}$ of a node may be derived from the Shannon formula as follows:

$$p_i^{SE} = \frac{\sigma^2}{h_i}\left(2^{\frac{u_i}{B_i}} - 1\right). \quad (19)$$

At a receiving node i, filtering, shaping, amplifying, analog-to-digital conversion, and the like need to be performed on a signal, and therefore, receiving power consumption of node i may be expressed as:

$$p_i^{RE} = M_i(p_i^{LNA} + p_i^{MIX} + p_i^{IFA} + p_i^F + p_i^{AD}), \quad (20)$$

where $M_i$ represents a number of antennas on the $i^{th}$ node, $p_i^{LNA}$ represents the power consumption of a low-noise amplifier on the $i^{th}$ node, $p_i^{MIX}$ the power consumption of a mixer on the $i^{th}$ node, $p_i^{IFA}$ represents the power consumption of a frequency amplifier on the $i^{th}$ node, $p_i^F$ represents the power consumption of a filter on the $i^{th}$ node, and $p_i^{AD}$ represents the power consumption for converting an analog signal into a digital signal on the $i^{th}$ node.

By modeling the network energy consumption, when selecting nodes, it is not only necessary to meet the service quality request of user but also necessary to ensure that the node energy consumption is minimized. For the network slice resource allocation, not only the nodes but also the links need to be managed, and the links need to be planned to improve the performance of system.

In the implementation, building a link power consumption model in step S3 specifically includes:

calculating a bandwidth of link e:

$$x_e^s = \sum_{l \in \Psi} y_l^s = \sum_{l \in \Theta} g_{e,l}^s y_l^s, \quad (5)$$

where a network controller calculates $L_s$ candidate paths from a source node to a destination node that meet the user demands. There are O paths in total, denoted by $\Psi$, from the source node to the destination node. The candidate paths, denoted by $\Theta$, are included in all paths from the source node to the destination node, namely, $\Theta \subseteq \Psi$, $\Psi=\{l_1, l_2, \ldots, l_{L_s}, \ldots, l_{O_f}\}$. In the Eq. (5), $y_l^s$ represents the bandwidth allocated to path l, and $g_{e,l}^s$ represents whether link e is used in path l of slice s, $l_1$ is the first candidate path from the source node to the destination node, $l_2$ is the second candidate path, $l_{L_s}$ is the $L_s^{th}$ candidate path, and $l_{O_f}$ is the $O_f^{th}$ path from the source node to the destination node. A method for calculating the candidate path includes: 1) by using a primal-dual algorithm, starting from any feasible flow on a network with a flow value (also known as an available bandwidth) $x \leq v$, increasing the flow values of links on the network and modifying the potentials of nodes; and 2) iterating the links and the nodes on the network until a flow that meets a predetermined constraint condition is obtained, to obtain a target candidate path, namely, the bandwidth allocation of links, where v represents a flow value requested by user (i.e., a requested data transmission rate). If an initial flow value is greater than v, the candidate path can be directly obtained. A link price $\rho_e(x_e^s)$ is calculated according to the bandwidth of link e, where the link price is a function of link bandwidth, and $\rho_e(x_e^s)$ is used as the link power consumption model. A final cost model belonging to link e in slice s is $\rho_e(x_e^s)$, and $$\sum_{e \in \xi_s} \rho_e(x_e^s)$$

represents the total cost of links in slice s.

Specifically, for a slice s∈S, the user makes a request, and the network controller calculates $L_s$ candidate paths from the source node to the destination node that meet the user demands. There are O paths in total, denoted by Ψ, from the source node to the destination node, and the candidate paths, denoted by Θ, are included in all paths from the source node to the destination node, namely, Θ⊆Ψ, Ψ={$l_1$, $l_2$, ..., $l_{L_s}$, ..., $l_O$}. Then several variables with a value of 0 or 1 are defined to describe the link states on the network: for the slice s∈S, $q_{f,l}^s$ represents whether a request of a user f is carried on path l, $g_{e,l}^s$ represents whether link e is used on path l, and $h_{i,l}^s$ represents whether node i is used on path l. When a candidate path requested by user f is obtained, the foregoing variables may also be determined accordingly. The request of user f may be expressed as f=($s_f$, $t_f$, $r_f$), where $s_f$ represents a source node requested by user f, $t_f$ represents a destination node requested by user f, $r_f$ represents the data transmission rate requested by user f. The bandwidth allocation on path l is the bandwidth allocation on path l from the source node to the destination node in slice s, and the data transmission rate requested by user f is:

$$r_f = \sum_{l \in \Psi} y_l^s = \sum_{l \in \Theta} q_{f,l}^s y_l^s. \qquad (21)$$

The bandwidth calculation formula of link e is Eq. (5), and the link price is a function of link bandwidth, which may be expressed as $\rho_e(x_e^s)$.

In order to meet a delay requirement of users, the network controller first allocates a candidate path for each user. A network delay includes a propagation delay on a link, a queuing delay, and a processing delay of function modules on a virtual network. A framework has been proposed, which uses the parallelization capability of a general purpose processor to model a processing delay of virtual network function instances, and solves the global optimal solution by sequentially searching a set of feasible regions. Therefore, when a delay requirement requested by user is given, the total delay budget of user may be obtained by calculating the processing delay on a candidate path and a virtual network function, thereby ensuring the delay requirement of user. Next, the selection of network candidate paths (links) is introduced.

Different users have different requirements for network delay. In order to ensure the delay requirement of a network slice, the controller calculates a candidate path for each user that meets the delay budget requirement thereof. The network slice relates to a technology for dividing a physical network into a plurality of virtual logical networks through virtualizations, and modeling the business request of each user, to form a single-source single-sink minimum cost flow problem. For a given network N=(s, t, V, A, C, U), where s represents a starting point, t represents an end point, V is a set of network nodes, A is a set of links on the network, C is a unit cost, U is an upper bound of flow amounts of links on the network, and 0 is a lower bound of flow amounts of links, a minimum cost flow x with a flow value of v from the source node to the destination node is calculated. For this single-source single-sink network, when a network capacity meets the requested conditions, a transit node keeps a flow conservation and a flow with a flow value less than v is referred to as a feasible flow. A residual network corresponding to the feasible flow x on network N may be expressed as N(x)=(s,t,A(x),C(x),U(x)), $$A(x) = \{(i, j) | (i, j) \in A, x_{ij} < u_{ij}\} \cup \{(i, j) | (j, i) \in A, x_{ji} > 0\}, \qquad (22)$$

$$c_{ij}(x) = \begin{cases} c_{ij}, & (i, j) \in A, \ x_{ij} < u_{ij} \\ -c_{ji}, & (j, i) \in A, \ x_{ji} > 0 \end{cases}, \qquad (23)$$

$$u_{ij}(x) = \begin{cases} u_{ij} - x_{ij}, & (i, j) \in A, \ x_{ij} < u_{ij} \\ x_{ji}, & (j, i) \in A, \ x_{ji} > 0 \end{cases}, \qquad (24)$$

where $c_{ij}(x)$ represents a unit cost per flow on the link between node i and node j through which a flow with a flow value x passes, $x_{ij}$ represents a flow amount on the link between node i and node j through which the flow passes, and $u_{ij}$ represents the upper bound of flow amount on the link between node i and node j. The nodes i and j represent adjacent nodes.

Therefore, the minimum cost flow problem with a flow value v from source node s to destination node t may be expressed as follows:

$$\min \sum_{(i,j) \in A} c_{ij} x_{ij}, \qquad (25)$$

$$\text{s.t.:} \sum_{(j,i) \in A} x_{ji} - \sum_{(j,i) \in A} x_{ji} = \begin{cases} v, & i = s \\ -v, & i = t \\ 0, & i \in V, i \neq s, t \end{cases},$$

$$0 \leq x_{ij} \leq u_{ij}, (i, j) \in A.$$

Eq (25) is to multiply the unit cost per flow by the flow amount, and then the products are summed up to obtain the total cost.

Using a primal-dual algorithm and introducing dual variables π, z, a dual problem of the foregoing problem may be expressed as:

$$w(\pi, z) = \sum_{i \in V} d_i \pi_i - \sum_{(i,j) \in A} u_{ij} z_{ij}, \qquad (26)$$

$$\text{s.t.:} \ \pi_i - \pi_j - z_{ij} \leq c_{ij}, \ (i, j) \in A,$$

$$z_{ij} \geq 0, \ (i, j) \in A.$$

A feasible solution to the foregoing problem meets complementary the slackness conditions, i.e.:

$$x_{ij}(\pi_i - \pi_j - z_{ij} - c_{ij}) = 0, (i,j) \in A, \qquad (27)$$

$$z_{ij}(x_{ij} - u_{ij}) = 0, (i,j) \in A, \qquad (28)$$

where $\pi_i$ represents the potential of node i. A core idea of the primal-dual algorithm is to start from any feasible flow on a network with a flow value x≤v, increase the flow values of the links on the network and modify the potentials of nodes, and iterate the links and the nodes on the network until a flow that meets the constraint condition is obtained. Generally, the primal-dual algorithm is to augment the flow amount along the direction of link, $\pi_i-\pi_j=c_{ij}$, and a subnet $N^0(x)$ including the links meeting $\pi_i-\pi_j=c_{ij}$ in the residual network $N(x)$ is calculated to find an augmented link in the subnet for augmentation. The $N^0(x)$ may be expressed as:

$$N^0(x) = \begin{cases} (i,j), \text{ if } (i,j) \in A, \ \pi_i - \pi_j = c_{ij}, \ x_{ij} \le u_{ij} \\ (j,i), \text{ if } (i,j) \in A, \ \pi_i - \pi_j = c_{ij}, \ x_{ij} > 0 \end{cases}. \quad (29)$$

When an augmented link with a flow value less than v cannot be found in the subnet $N^0(x)$, the potential on node is modified so that the modified potential can meet the foregoing constraints. The algorithm steps may be summarized as follows.

In step 1, a feasible flow x with a source points and an end point t is selected in a network $N=(s, t, V, A, C, U)$, and the initial potential of each node is set to $\pi=0$.

In step 2, when the flow amount of a feasible flow $x \ge v$, the algorithm ends, and a minimum cost flow x with a required flow value v is found in a network; when the flow amount of a feasible flow $x < v$, in the residual network $N(x)$, the link cost $c_{ij}\pi = c_{ij}-\pi_i+\pi_j$ is updated, the shortest path length $d(i)$ from source node to node i is calculated, and $\pi_i=\pi_i-d(i)$ is updated.

In step 3, the maximum flow from node s to node t in the residual network $N^0(x)$ is recalculated. If the maximum flow is 0, the problem has no solution. Otherwise, an augmentation is performed along the links in the maximum flow calculated above, and the operation proceeds to step 1.

The time complexity of the algorithm is analyzed, and it can be seen from the foregoing algorithm steps that a loop iteration process is to modify the flow values of the links in the network and the potentials of the nodes with a total number of iterations less than or equal to min(nU,nC). And the time complexity for calculating the shortest path in the network is S(n,m,C), and the time complexity for calculating the maximum flow is M(n,m,U), and therefore, the time complexity of the algorithm may be expressed as O(min{nU,nC}[S(n,m,nC)+M(n,m,U)]).

In the implementation, determining a revenue of the VInP according to the VInP utility model, the node power consumption model, and the link power consumption model in step S4 includes:

determining the utility obtained by the VInP for slice s:

$$Q_p^s(x^s, p^s) = \phi_s(x^s, p^s, \rho)r - \left(\sum_{l \in \Theta} \varphi_i(p_i^s)h_{i,l}^s + \sum_{l \in \Theta} \varphi_e(x_e^s)g_{e,l}^s\right)r, \quad (6)$$

where $\phi_s(x^s,p^s,\rho)r$ represents a charge for the slice provided by the VInP, $x^s$ is the bandwidth of slice s, $p^s$ is the power consumption of slice s, $\rho$ is a price, $$\left(\sum_{l \in \Theta} \varphi_i(p_i^s)h_{i,l}^s + \sum_{l \in \Theta} \varphi_e(x_e^s)g_{e,l}^s\right)r$$

represents the cost for providing a service, $\varphi_i(p_i^s)$ represents the price of node i, $\varphi_e(x_e^s)$ represents the price of link e, $\varphi(\cdot)$ is a monotonical increasing function, $h_{i,l}^s$ represents whether node i is used in path l, and $g_{e,l}^s$ represents whether link e is used in path l;

determining the revenue of the VInP according to the utility obtained by the VInP for slice s:

$$Q_p = \sum_{s \in S} Q_p^s(x^s, p^s), \quad (7)$$

where a server has the largest profit, namely, the following conditions are met:

max $Q_p^s(x^s,p^s)$, s.t.:$x_e^s \le c_e^{pro}$, $p_i^s \le v_i^{pro}$, where $x_e^s$ represents the bandwidth of link e, $c_e^{pro}$ represents the remaining maximum bandwidth available for allocation that is provided by link e, $p_i^s$ represents the power consumption of node i in slice s, and $v_i^{pro}$ represents the remaining maximum data transmission rate that node i is able to support.

Specifically, by modeling node energy consumption and links, a network slice is a virtual network formed by the nodes and the links. The VInP is regarded as the owner of the slice, a user is regarded as a bidder of the slice, and the utility model of VInP and the utility model of user need to be established based on the node and link information, respectively.

The revenue function of VInP may be expressed as a difference between a charge for providing a slice and a cost for providing services on a network, and the utility of VInP obtained for a slice may be expressed as Eq. (6). Variables $c_e^{pro}$ and $v_i^{pro}$ are related to the physical infrastructure and have been determined when the network is established.

In the implementation, the revenue of user determined by the user utility model, the node power consumption model, and the link power consumption model in step S4 includes:

determining the utility of user:

$$U_s(r) = w_s \log(l+r), \quad (8)$$

where $w_s$ represents a service quality request level of user, and r represents a data transmission rate; Eq. (8) is used to express the relationship between data transmission rate and user utility;

determining the cost of user for building a slice, according to the node power consumption model and the link power consumption model:

$$\phi_s(x^s, p^s, \rho) = \sum_{e \in \xi_s} \rho_e(x_e^s) + \sum_{i \in N_s} \rho_i(x_i^s), \quad (9)$$

where $x_e^s$ represents link allocation, $p_i^s$ represents a node allocation status, $\rho_e(\cdot)$ represents the functional relationship between a link unit price and a link allocation bandwidth, $\rho_i(\cdot)$ represents the relationship between node unit price and node power consumption, $$\sum_{i \in N_s} \rho_i(x_i^s)$$

represents the cost paid by user for purchasing a node, $$\sum_{e \in \xi_s} \rho_e(x_e^s)$$

represents the cost paid by user for purchasing a link; $\xi_s$ is a set of links in slice s, and $N_s$ is a set of nodes in slice s; and determining the revenue of user according to the utility of user and the cost of user for building a slice, namely, the total revenues from all slices purchased by user:

$$Q_c = \Sigma_{s \in S} Q_c^s, \quad (10)$$

where the expression above is maximized:

$$\max Q_c^s = \sum_{f \in K_s} U_s(r_f) - \phi_s(x^s, p^s, \rho)r,$$

$$\text{s.t.:} \quad x_e^s \geq c_e^{req},$$

$$p_i^s \geq v_i^{req}.$$

$Q_c^s$ represents a revenue from slice s purchased by user, S represents a set of slices, $r_f$ represents the data transmission rate requested by user f, the expression following s.t. represents a constraint condition, $x_e^s$ represents the bandwidth of link e, $c_e^{req}$ represents the bandwidth requested by user, $p_i^s$ represents the power consumption of node i in slice s, and $v_i^{req}$ represents the node data transmission rate requested by user.

Specifically, by modeling node energy consumption and links, a network slice is a virtual network formed by the nodes and the links. The VInP is regarded as the owner of the slice, a user is regarded as a bidder of the slice, and the utility model of VInP and the utility model of user need to be established based on node information and link information, respectively.

The utility of user mainly includes two parts, namely, a utility from receiving data services and a cost paid for occupying resources. Specifically, as shown in Eq. (8), where $w_s$ represents a service quality request level of a user, namely, the requirement for a transmission rate. The higher the requirement for transmission rate of the user is, the greater the generated revenue is, and r represents the data transmission rate. The cost that the a user needs to pay for building slices is a sum of the cost for purchasing nodes and the cost for purchasing links, which may be expressed as Eq. (9).

It should be noted that a slice is provided by network controller. As the upper and lower entities on networks, both VInP and users hope to build a slice to maximize the utilities thereof. Building a slice means a revenue or expenditure for a user to purchase the slice.

In the embodiment, step S5 specifically includes:

calculating the total revenue of a slice according to the revenue of VInP and the revenue of user:

$$\max Q^s = \max(Q_c^s + Q_p^s) = \max\left(\sum_{f \in K_s} w_s \log\left(1 + \sum_{l \in \Theta} q_{f,l}^s y_l^s\right) - \left(\sum_{i \in \Theta} \varphi_i, (p_i^s) h_{i,j}^s + \sum_{l \in \Theta} \varphi_e(x_e^s) g_{e,l}^s\right)r\right), \quad (11)$$

$$\text{s.t.:} \quad x_e^s \geq c_e^{req}, \, p_i^s \geq v_i^{req}, \, x_e^s \leq c_e^{pro}, \, p_i^s \leq v_i^{pro},$$

where $Q_c^s$ represents the revenue from slice s purchased by user, $Q_p^s$ is the utility obtained by VInP from slice s, f is a user, $K_s$ is a set of users, $w_s$ represents the service quality request level of user, $q_{f,l}^s$ represents whether the request of user f is carried on path l, $y_l^s$ is the bandwidth allocation on path l, $\Theta$ is the candidate paths included in all paths from the source node to the destination node, l is a path, $\varphi_i(p_i^s)$ represents the price of node i, $h_{i,l}^s$ represents whether node i is used on path l, $\varphi_e(x_e^s)$ represents the price of link e, $g_{e,i}^s$ represents whether link e is used on path l, $c_e^{req}$ represents the bandwidth requested by user, $v_i^{req}$ represents the node data transmission rate requested by user, $C_e^{pro}$ represents the remaining maximum bandwidth available for allocation that is provided by link, $v_i^{pro}$ represents the remaining maximum data transmission rate that is provided and is able to be supported by node i, and the constraint condition is the constraint on requesting for a node and a link by user, and the constraint on responding to a node and bandwidth at the VInP side.

Specifically, in order to maximize the overall benefit, a VInP provides slice resources for a plurality of users. A user builds a utility function thereof to evaluate a slice. Different users have different estimated values for a same slice, and through a competitive game to the slice, the slice resource is allocated.

The construction of network model is based on the allocation of network slice resources. For the foregoing establishment of problem model, the link price is related to the number of links occupied by a slice, and the node price is also related to the node resource occupied by a slice. For user f slice s is allocated, and the generated data flow is transmitted at rates of $r_1, r_2, \ldots, r_k$ on a plurality of paths $l_1, l_2, \ldots, l_k$. If the price of each link and the price of each node are fixed, the unit price $\rho(l)$ for path l in a slice may be defined as a sum of link resources and node resources through which a unit of data is transmitted, and is expressed as $\rho(l) = \rho_e(x_e^s) + \rho(p_i^s)$. The prices for the plurality of paths $l_1, l_2, \ldots, l_k$ may be sorted as $\rho(l_1) \leq \rho(l_2) \leq \ldots \leq \rho(l_k)$. Assumed that the total data transmission rate for user f is t, then t may be expressed as:

$$t = \sum_{i=1}^{k} r_i. \quad (30)$$

Therefore, the objective function of user may be expressed as:

$$Q_c^s = \sum_{f \in K_s} U_s(t) - \rho(l)t = w_s \log(1 + t) - \rho(l)t. \quad (31)$$

In order to maximize the objective function, the optimal data transmission rate of user f may be expressed as:

$$t^* = \frac{w_s}{\rho(l)} - 1. \quad (32)$$

If the resource allocation of slices is unchanged and the transmission is always performed on a path with the lowest price, a waste of resources will be caused. Although various resources in slice s have the lowest unit price, the final benefit is not necessarily the largest. In the present disclosure, the link resources and node resources in a slice are auctioned by using an auction algorithm, and a plurality of users compete for the slice resources, so as to maximize their benefits. The users need to meet their demands while accessing networks at the minimum cost. The VInP provides users with the customized slice services while improving the economic benefits of networks. On this issue, we formulate the problem of slice resource allocation as an auction problem. We determine the allocation strategies of link resources and node resources according to the prices submitted by a plurality of users, namely, bidding information, so as to maximize the overall benefit of the system.

In the embodiment, when a competitive game mechanism is used to allocate the slice resources in step S6, a mutual information-based competitive game strategy is adopted. The revenue at the user end is used as the estimated value of user for a slice, the revenue at the VInP end is used as the value of slice. The estimated value a of user for a slice is a random variable, the value of slice is also a random variable p, there is a specific relationship between a and p. I(a,p) represents a degree of correlation between the estimated value of slice and the value of slice.

The following specifically introduces the competitive game allocation strategy adopted in the present disclosure in the process of solving the network model.

For the allocation of slice resources, a plurality of users make their requests to a VInP, and the VInP may use an auction algorithm to realize a competitive game for a slice among a plurality of users. The slice value has a specific relationship with the estimated value of user for the slice. The mutual information may be used to represent the relationship between the slice value and the estimated value, and this relationship is fully considered in the competitive game process, for the auction of slice resources.

Figure 2:
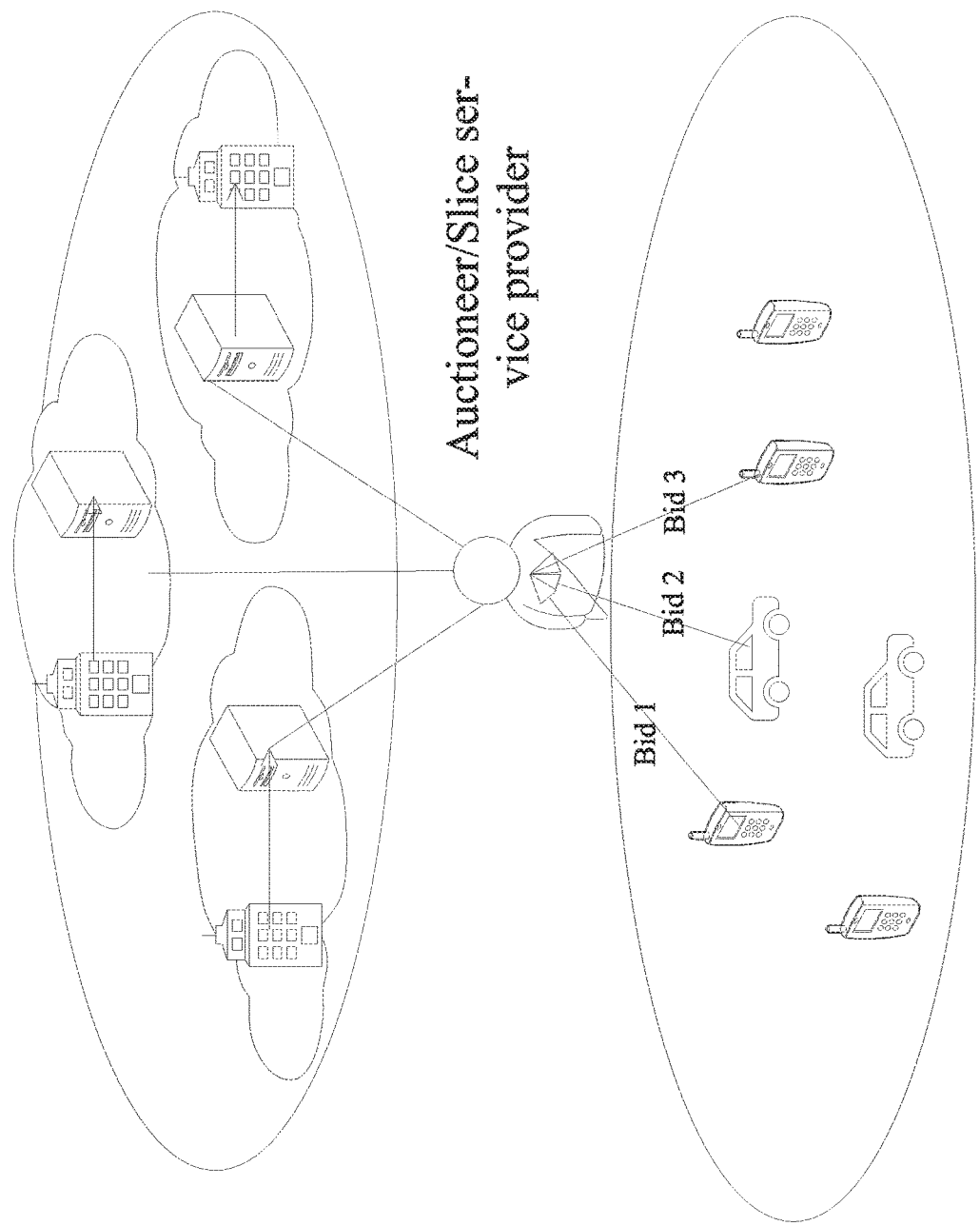
FIG. 2 is a model frame diagram of an auction system in a competitive game process according to the present disclosure.

The model frame diagram of an auction system in the competitive game process is illustrated in FIG. 2, in which different users as bidders submit their requests to the VInP. The bidding prices of different node resources and link resources are different, and the objective of users is to meet their performance requirements with a lowest price, while a service provider hopes to maximize its benefits by auctioning network resources. Users determine their bidding prices through competitive game strategies, namely, Eq. (40). Finally, an auctioneer determines the final ownership of slice resources.

(1) The Game Strategy Based on Mutual Information

The slice value has a specific relationship with the estimated value of user for this slice. The mutual information may be used to express the relationship between the slice value and the estimated value, so as to put forward a game strategy based on mutual information. As a measure of similarity, the mutual information can describe the correlation degree between two variables. The greater a value of mutual information between two variables is, the greater the correlation degree is. The mutual information coming from the information theory, is used to describe a statistical correlation degree between two variables, and is usually represented by information entropy. The information entropy is first proposed by Shannon to measure how much information a variable includes. It is assumed that P(X) represents a probability that an event X occurs. The definition of information entropy is:

$$H(X, Y) = -\sum_x P(x) \log P(x). \quad (33)$$

The information entropy is a statistic that measures the uncertainty of a variable. The greater the uncertainty is, the greater the corresponding information entropy is. Therefore, when variables occur with a same probability, the information entropy reaches a maximum value. When a variable occurs with a probability of 1, the information entropy reaches the minimum value of 0. Joint entropy is the measure of uncertainty degree to a jointly distributed random system, and is an amount of information obtained by observing a random system with one or more random variables. The joint entropy is defined as:

$$H(X, Y) = -\sum_x \sum_y P(x, y) \log P(x, y), \quad (34)$$

where x and y are the specific values of X and Y correspondingly, P(x,y) is the joint probability of these values appearing together. The mutual information indicates whether two variables are related to each other, and the correlation strength. The greater the mutual information is, the stronger the correlation between variables is. The mutual information may be regarded as an extension of correlation coefficients in the case of high-dimensional nonlinearity. It is assumed that H(A) and H(B) are information entropy of user A and user B respectively, and H(A,B) represents the joint entropy of two users. The mutual information is defined as: I(A,B)=H(A)+H(B)—H(A,B). The mutual information describes a degree of statistical independence between two users. If A and B are independent of each other, I(A,B)=0. If A and B are completely dependent or completely inclusive, H(A)=H(B)=H(A,B), and the mutual information is the largest at this time.

In the game of the present disclosure, the estimated value a of user for a slice is used as a random variable, a slice value is also a random variable p, there is a specific relationship between a and p. I(a,p) represents the correlation degree between the estimated value and the slice value.

Different users submit their requests to a VInP as bidders, and the bidding prices of different node resources and link resources are different. The objective of users is to meet their performance requirements with a lowest price, while a service provider hopes to maximize its benefits by auctioning network resources. It is assumed that the network benefit obtained by the $k^{th}$ user, to whom the $l^{th}$ network slice is allocated, is $a_{kl}$. For an auction system, to maximize the overall network benefits of system, a set of assignable network slices for the $k^{th}$ service flow is A(k). If A(k)=φ, it indicates that the request is unreachable and the access is denied; otherwise, the optimal allocation scheme is selected for the $k^{th}$ user in set A(k) according to the bidding information of users. The set B is used to represent a two-tuple consisting of the $k^{th}$ user and the $l^{th}$ network slice, namely:

$$B=\{(k,l)|l \in A(k), k=1,2,\ldots,n\}. \quad (35)$$

The set S of bidding information is a set of two-tuples consisting of the $k^{th}$ user and the $l^{th}$ slice. If the set is empty, the slice needs to be recreated. Otherwise, a customized network slice is auctioned. The set S should satisfy the following items:

1) for ∀(k,l)∈ S, l∈ A(k);
2) for each service flow k from user, there exists (∃) at most one group (k, l) pertaining to set S, and for each slice l, there exists (∃) at most one group (k, l) pertaining to set S.

The network resources are auctioned by using the auction algorithm while meeting ε complementary slackness conditions, namely, if a value vector p=(p₁, p₂, . . . , pₙ) of slice l and the allocation of S satisfies:

$$a_{kl} - p_l \geq \max_{t \in A(k)}(a_{kl} - p_t) - \varepsilon, \quad (36)$$

then when the $l^{th}$ slice is allocated to the $k^{th}$ user, the network benefit is the most. If complementary slackness conditions ε, are satisfied for each slice, it refers to that S and P satisfy the ε complementary slackness conditions. During the auction process, the slice price may not drop, and the users to whom slices have been allocated upon the beginning of iteration are still in the state of being allocated at the end. The auction process is mainly divided into an auction bidding stage and an auction allocation stage.

(2) Auction Bidding Stage

The $k^{th}$ user loops through all network slices in A(k) to calculate the optimal network slice $l_k$ with a subscript of k, namely:

$$l_k = \arg\max_{l \in A(k)} \{a_{kl} - p_l\}, \quad (37)$$

for the $k^{th}$ user, an expected revenue from bidding is $v_k$, which may be expressed as:

$$v_k = \max_{l \in A(k)} \{a_{k,l} - p_l\}, \quad (38)$$

other network slices other than $l_k$ are found to maximize the revenue of the $k^{th}$ user, expressed as $w_k$, namely:

$$w_k = \max_{l \in A(k), l \neq l_k} \{a_{kl} - p_l\}, \quad (39)$$

where $w_k$ represents the second largest benefit value.

If set A(k) includes only one slice l, $w_k = -\infty$, and a bid of the $k^{th}$ user for the $l_k^{th}$ slice may be expressed as:

$$b_{kl_k} = p_{l_k} + v_k - w_k + \varepsilon I(a_{kl_k}, p_l) = a_{kl_k} - w_k + \varepsilon I(a_{kl_k}, p_l). \quad (40)$$

Bid adjustment of the $k^{th}$ user for slice l is related to mutual information. When the estimated slice value of user is similar to the slice value, namely, the correlation is stronger, the user may adjust the price appropriately. If the correlation between the estimated slice value of user and slice value is weaker, it indicates that the requested slice is not the slice excepted by user, and the bidding price may not change much.

(3) Auction Allocation Stage

One network slice may meet the network performance requirements of a plurality of service flows, therefore, it is needed to select the optimal one from the bidding information for allocation. A set of bidding information for the $l^{th}$ slice is represented by $P_l$. The highest bid $p_l$ is selected to update set S, and replace (k,l) with ($k_l$,l), $$p_l = \max_{k \in P(l)} b_{kl}. \quad (41)$$

Generally, there are two options for bidding users. One is that a bid includes only one unassigned user, which is similar to the Gauss-Seidel method for solving nonlinear equations and is suitable for calculation in a serial environment. The other one is that a bid includes all unassigned users, which is similar to the Jacobi method for solving nonlinear equations and is suitable for calculation in a parallel environment. In the iterative process of bidding, the bidding price is increased by at least ε each time, namely:

$$b_{kl_k} = p_{l_k} + \varepsilon I(a_{kl_k}, p_l). \quad (42)$$

At the end of each iteration, new allocation is made to network slices, so that a slice that receives a bid is allocated to a service flow that is not allocated at the beginning. In the process of auction, the ε complementary slackness conditions can be kept satisfied, namely, the allocation and value vectors satisfy the ε complementary slackness conditions at the beginning, and the ε complementary slackness conditions are still satisfied when the iteration ends. Each bidding of service flow may make the expected revenue $v_k$ of service flow be reduced by ε or remain unchanged. When the expected revenue remains unchanged, it indicates that there are at least two slices, so that the business flow revenue is $v_k$, where $$v_k = \max_{l \in A(k)} \{a_{kl} - p_l\}.$$

The $l_k^{th}$ network slice that accepts the bid has its bidding price increased by at least ε, therefore, the $l_k^{th}$ slice cannot be allocated to the $k^{th}$ service flow, and a re-bidding is required.

The scale of ε in bidding algorithm has a great influence on a the running time of this algorithm. Generally, a larger ε value is selected at the beginning, and with the iteration of bidding information, ε gradually decreases. The final $\bar{\varepsilon}$ should make $n\bar{\varepsilon}$ small enough to use the following equation to iterate:

$$\varepsilon^{k+1} = \frac{\varepsilon^k}{\theta}, k = 0, 1, \ldots, \quad (43)$$

where $\varepsilon^0$ is an initial value of ε, and θ is an integer greater than 1.

When the auction algorithm has no a feasible solution, the system does not know whether the problem is unsolvable or is difficult to be solved, unless the conditions are further restricted. Therefore, some specific constraints are required. The unsolvable judgment basis for the auction algorithm is that $v_k$ has a lower bound at the beginning, and the final iteration makes $v_k$ be not lower than the lower bound.

In the following, a specific example is used to compare the method provided in the present disclosure to the existing method to verify the resource allocation effect of the present disclosure. The scheme (CC) proposed in the present disclosure is compared with a Stackelberg Game (SG) strategy and a Dynamic Allocation (DA) strategy.

Figure 3:
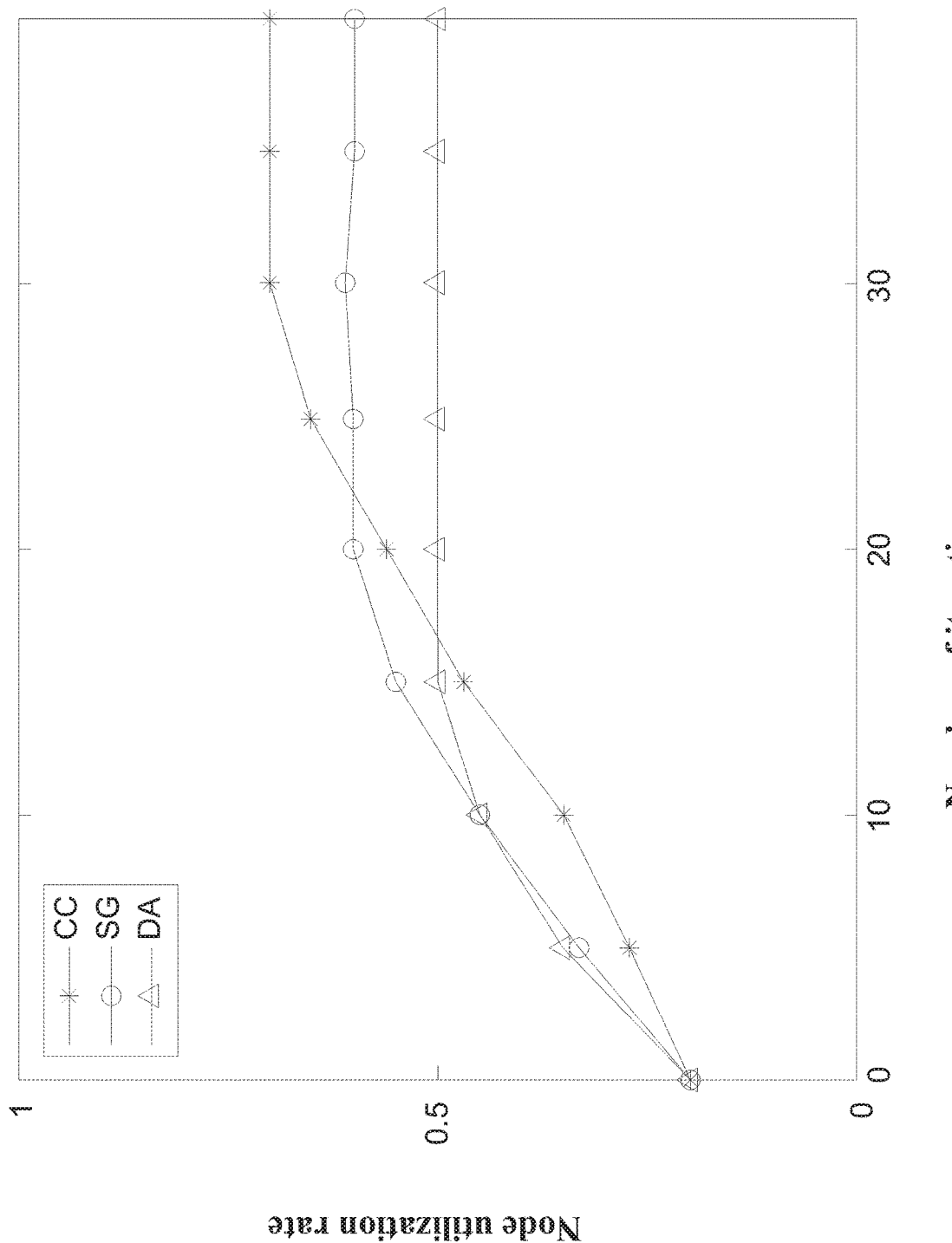
FIG. 3 is a graph of node utilization rate obtained by three methods.

As shown in FIG. 3, in the initial stage, for a node, because a leader-followers mode is used in Stackelberg Game to allocate resources, the node utilization rate is high. The resources are allocated dynamically according to user requests in Dynamic Allocation (DA) strategy, therefore, the node utilization rate is relatively high. However, as the number of iterations increases, SG does not consider a situation in which multiple users competes for resources, and there is no master/subordinate relationship between multiple users, which may lead to a relatively low node utilization rate. Best effort is made to meet the demands of users in DA strategy, so that the node utilization rate is relatively low. The relationship among users for resource competition is fully considered in CC, and the mutual information is used to associate with the relationship between users and slices, so that the node utilization rate is improved.

Figure 4:
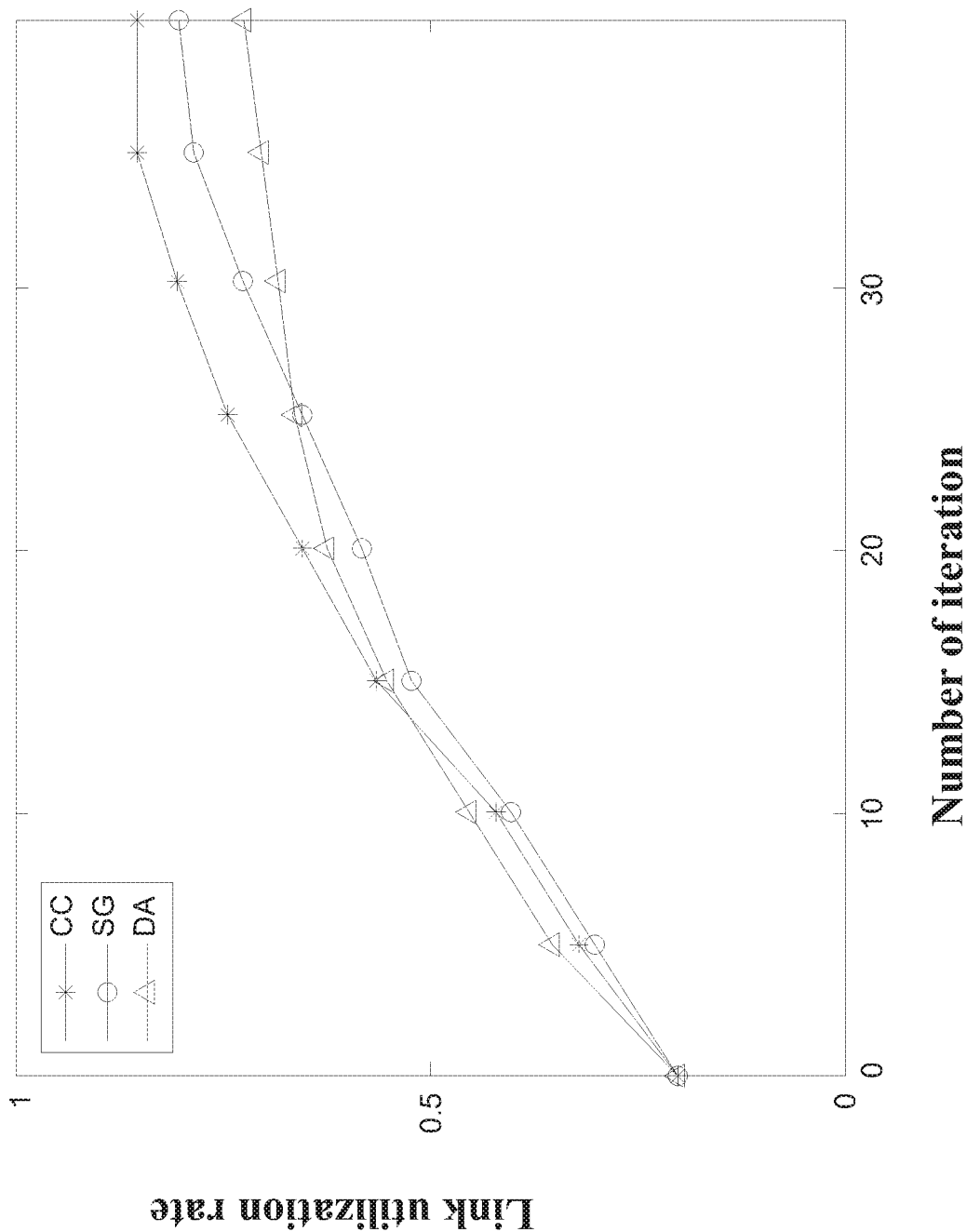
FIG. 4 is a graph of link utilization rate obtained by three methods.

As shown in FIG. 4, the utilization rates of link in three different schemes increase as the number of iterations increases. For the DA resource allocation scheme, the price of link resources does not change, and network controller preferentially allocates the cheap links. As the number of iterations increases, the network capacity of a key link quickly reaches the limit, making the utilization rate of link resources be maximized. However, for CC and SG, the user and the VInP are in a game. The network controller dynamically allocates the link resources according to the game strategy, and the link price is dynamically adjusted according to the network status to avoid the emergence of key link, so that the utilization rate of link is improved. A link is modeled in CC, and the link price is related to the link allocation bandwidth, so that the utilization rate of link is improved.

Figure 5:
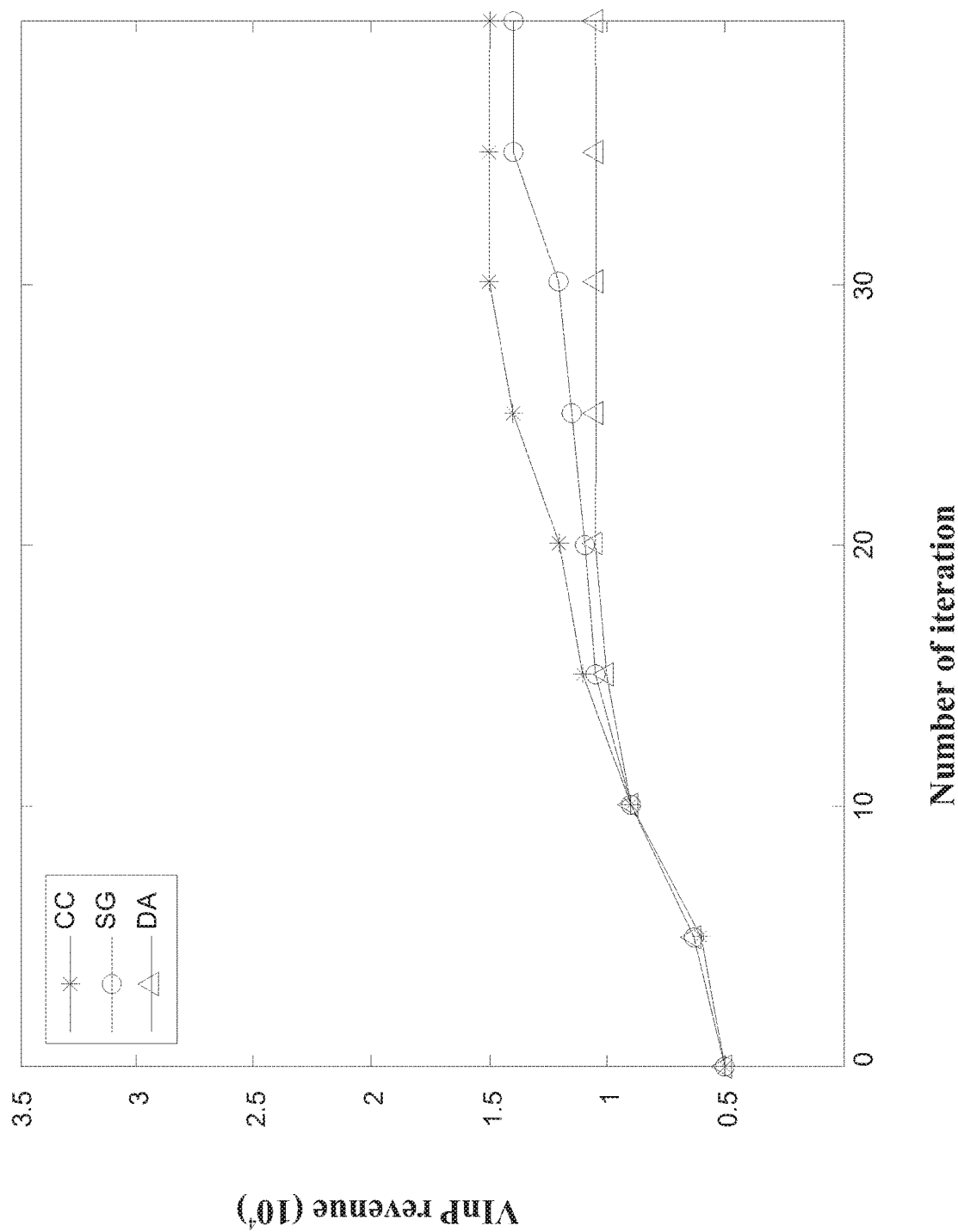
FIG. 5 is a graph of VInP benefits obtained by three methods.

As shown in FIG. 5, the three slice resource schemes are compared. Regarding the revenue of VInP, there is a little difference among the three slice resource schemes in the initial iteration. As the number of iterations increases, an advantage of resource allocation scheme based on a game theory is reflected, and the revenues of VInP in CC and SG are greater than the revenue of VInP in DA. Because mutual information theory is used in CC to associate the slice value with the estimated slice value of user and adjust the competitive game strategy, the utility of VInP reaches to the maximum value earlier.

In general, aiming at a multi-user slice resource allocation method, the present disclosure formulates the slice resource allocation as a two-tier architecture of virtual infrastructure service providers (VInPs) and users. The VInPs and users establish their utility models respectively. A marginal economic benefit is used to build a revenue model for user, and the user satisfaction is modeled by considering the relationship between the resources requested by user and the actual allocated resources. A cooperative competition mechanism is used to adjust a resource price and a quantity of allocated resources, such that a Nash equilibrium is finally reached. Compared to other game strategies, the user utility has been improved; and the experiments are used to verify the existence of Nash equilibrium. For a situation where a plurality of users request a same network slice resource, the node energy consumption and link selection play an important role in slice resource allocation. A slice is modeled as a combination of nodes and links, a plurality of users bid on this slice, and the competitive game strategy is used to allocate slice resources to the users, and the estimated slice value of user is the utility function. It is proposed to use mutual information to reflect the relationship between an estimated slice value and a slice value, and a slice resource allocation scheme is obtained by adjusting a bidding strategy. Finally, the utilization rate of node and link resources in this scheme is proved to be improved through experiments, and the introduction of mutual information enables the system to reach a Nash equilibrium earlier and improves the network benefits.

The above embodiments are provided merely for an objective of describing the present disclosure and are not intended to limit the scope of the present disclosure. The scope of the present disclosure is defined by the appended claims. Various equivalent replacements and modifications made without departing from the spirit and scope of the present disclosure should all fall within the scope of the present disclosure.

What is claimed is:

1. A multi-user network slice resource allocation method based on competitive game, comprising:
   S1: modeling a network system as a two-tier architecture of virtual infrastructure network service providers (VInPs) and users, wherein a VInP layer comprises a plurality of VInPs and a user layer comprises a plurality of users;
   S2: building a VInP utility model and a user utility model;
   S3: dividing a network slice resource into nodes and links for allocation, and building a node power consumption model and a link power consumption model;
   S4: determining a revenue of each VInP according to the VInP utility model, the node power consumption model, and the link power consumption model, and determining a revenue of each user according to the user utility model, the node power consumption model, and the link power consumption model;
   S5: calculating a total revenue of a slice according to the revenue of the VInP and the revenue of the user, and using the total revenue of the slice as a network model;
   S6: solving the network model, wherein the VInP is used as a seller, the user is used as a buyer, the seller determines an initial price according to a total quantity of slice resources, and the buyer bids on the slice; and allocating the slice resources by using a competitive game mechanism; and
   S7: implementing the network model on a network.

2. The allocation method according to claim 1, wherein the VInP utility model in S2 is built as:

$$G(p,q)=pq-cq, \quad (1)$$

wherein p represents an initial unit price of the slice resources given by the VInP, q represents a quantity of slice resources allocated by the VInP, and c represents a cost unit price of the slice resources;

the user utility model is:

$$F(p,q)=u(q)-l(p,q)+v(q), \quad (2)$$

wherein u(q) represents a utility generated from the slice resources acquired by user, l(p,q) represents a cost expended by the user for the resource, v(q) represents the user satisfaction, u(q)=wln(1+q), l(p,q)=pq, $$v(q) = \ln\left(\frac{m+q}{m}\right),$$

wherein w is a constant greater than 0 and represents a user weight, ln( ) represents a logarithmic function with the mathematical constant e as its base, m represents a quantity of resources requested by the user.

3. The allocation method according to claim 1, wherein the building a node power consumption model in S3 specifically comprises:
   calculating power consumption of a single node:

$$P_i = P_i^{SE} + P_i^{RE}, \quad (3)$$

wherein $P_i$ represents link power consumption of a accessed node i in a slice, $P_i^{SE}$ represents transmission power consumption of the accessed node i, and $P_i^{RE}$ represents reception power consumption of the accessed node i;

calculating node power consumption of the slice according to power consumption of the single node:

$$p_i^s = \Sigma h_{i,l}^s p_i, \quad (4)$$

wherein $h_{i,l}^s$ represents whether the node I is used in a path l, the path represents a complete link from a source node to a destination node, and s represents a label of the slice; and determining a node price $\rho_i(p_i^s)$ according to the node power consumption of the slice, wherein the node price is a function of the node power consumption, and $\rho_i(p_i^s)$ is used as the node power consumption model.

4. The allocation method according to claim 3, wherein the building a link power consumption model in S3 specifically comprises:

calculating a bandwidth of a link e:

$$x_e^s = \sum_{l \in \Psi} y_l^s = \sum_{l \in \Theta} g_{e,l}^s y_l^s, \quad (5)$$

wherein a network controller calculates $L_s$ candidate paths from the source node to the destination node that meet user demands, paths from the source node to the destination node are denoted by $\Psi$ and amount to O paths in total, the candidate paths, denoted by $\Theta$, are comprised in all paths from the source node to the destination node, wherein $\Theta \subseteq \Psi$, $\Psi = \{l_1, l_2, \ldots, l_{L_s}, \ldots, l_{O_f}\}$, $y_l^s$ represents bandwidth allocation on a path l, and $g_{e,l}^s$ represents whether a link e is used in the path l of a slice s, $l_1$ is a first candidate path from the source node to the destination node, $l_2$ is a second candidate path, $l_{L_s}$ is an $L_s^{th}$ candidate path, and $l_{O_f}$ is an $O_f^{th}$ path from the source node to the destination node, wherein a method for calculating the candidate paths comprises:

starting, through using a primal-dual algorithm, from any feasible flow in a network with a flow value $x \leq v$, increasing the flow values of links in the network and modify potentials of nodes; and iterating the links and the nodes in the network until a flow that meets a predetermined constraint condition is obtained, to obtain a target candidate path, wherein v represents a flow value requested by the user, the flow value being a requested data transmission rate, wherein if an initial flow value is greater than v, the target candidate path is directly obtained; and a link price $\rho_e(x_e^s)$ is calculated according to the bandwidth of the link e, wherein the link price is a function of the link bandwidth, $\rho_e(x_e^s)$ is used as the link power consumption model, and $x_e^s$ represents the bandwidth of the link e.

5. The allocation method according to claim 1, wherein the determining a revenue of each VInP according to the VInP utility model, the node power consumption model, and the link power consumption model in S4 comprises:

determining utility obtained by the VInP from a slice s:

$$Q_p^s(x^s, p^s) = \phi_s(x^s, p^s, \rho)r - \left(\sum_{l \in \Theta}\varphi_i(p_i^s)h_{i,l}^s + \sum_{l \in \Theta}\varphi_e(x_e^s)g_{e,l}^s\right)r, \quad (6)$$

wherein $\phi_s(x^s,p^s,\rho)r$ represents a charge for the slice s provided by the VInP, $x^s$ is a bandwidth of the slice s, $p^s$ s is power consumption of the slice s, $\rho$ is a price, $$\left(\sum_{l \in \Theta}\varphi_i(p_i^s)h_{i,l}^s + \sum_{l \in \Theta}\varphi_e(x_e^s)g_{e,l}^s\right)r$$

represents a cost for providing a service, $\varphi_i(p_i^s)$ represents a price of a node i, $\varphi_e(x_e^s)$ represents a price of a link e, $h_{i,l}^s$ represents whether the node i is used in a path l, $g_{e,l}^s$ represents whether the link e is used in a path l, $p_i^s$ is node power consumption of the slice s, and r represents a data transmission rate; and determining the revenue of the VInP according to the utility obtained by the VInP for the slice s:

$$Q_p = \sum_{s \in S} Q_p^s(x^s, p^s), \quad (7)$$

wherein S represents a set of slices, and a server has a largest profit when the following conditions are met:

max $Q_p^s(x^s, p^s)$, s.t.:$x_e^s \leq c_e^{pro}$, $p_i^s \leq v_i^{pro}$, wherein $x_e^s$ represents a bandwidth of the link e, $c_e^{pro}$ represents a remaining maximum bandwidth available for allocation that is provided by the link e, $p_i^s$ represents power consumption of the node i in the slice s, and $v_i^{pro}$ represents a remaining maximum data transmission rate that is provided and is able to be supported by the node i.

6. The allocation method according to claim 1, wherein the determining a revenue of each user according to the user utility model, the node power consumption model, and the link power consumption model in S4 comprises:

determining utility of the user:

$$U_s(r) = w_s \log(l+r), \quad (8)$$

wherein $w_s$ represents a service quality request level of the user, and r represents a data transmission rate;

determining a cost of the user for building the slice according to the node power consumption model and the link power consumption model:

$$\phi_s(x^s, p^s, \rho) = \sum_{e \in \xi_s} \rho_e(x_e^s) + \sum_{i \in N_s} \rho_i(x_i^s), \quad (9)$$

wherein $x_e^s$ represents link allocation, $p_i^s$ represents a node allocation status, $\rho e(\cdot)$ represents a functional relationship between a link unit price and a link allocation bandwidth, $\rho_i(\cdot)$ represents a relationship between a node unit price and node power consumption, $$\sum_{e \in \xi_s} \rho_e(x_e^s)$$

represents a cost paid by the user for purchasing the link, $$\sum_{i \in N_s} \rho_i(x_i^s)$$

represents a cost paid by the user for purchasing the node; $\xi_s$ is a set of links of a slice s, and $N_s$ is a set of nodes in the slice s;

determining the revenue of the user according to the utility of the user and the cost of the user for building the slice, wherein the revenue of the user is a total revenue of the user for purchasing all slices:

$$Q_c = \Sigma_{s \in S} Q_c^s, \quad (10)$$

wherein a following equation is maximized:

$$\max Q_c^s = \sum_{f \in K_s} U_s(r_f) - \phi_s(x^s, p^s, \rho)r,$$

$$\text{s.t.} \quad x_e^s \geq c_e^{req},$$

$$p_i^s \geq v_i^{req},$$

$Q_c^s$ represents a revenue from the slice s purchased by the user, S represents a set of slices, $r_f$ represents a data transmission rate requested by a user f, a expression following s.t. represents a constraint condition, $x_e^s$ represents a bandwidth of a link e, $C_e^{req}$ represents a bandwidth requested by the user, $p_i^s$ represents power consumption of a node i in the slice s, $v_i^{req}$ represents a node data transmission rate requested by the user, and $U_s(r_f)$ is utility of the user f.

7. The allocation method according to claim 5, wherein S5 specifically comprises:
calculating the total revenue of the slice according to the revenue of the VInP and the revenue of the user:

$$\max Q^s = \max(Q_c^s + Q_p^s) = \tag{11}$$

$$\max \sum_{f \in K_s} w_s \log\left(1 + \sum_{l \in \Theta} q_{f,l}^s y_l^s\right) - \left(\sum_{l \in \Theta} \phi_i(p_i^s)h_{i,j}^s + \sum_{l \in \Theta} \phi_e(x_e^s)g_{e,l}^s\right)r,$$

$$\text{s.t.:} \quad x_e^s \geq c_e^{req}, \; p_i^s \geq v_i^{req}, \; x_e^s \leq c_e^{pro}, \; p_i^s \leq v_i^{pro},$$

wherein $Q_c^s$ represents the revenue from the slice s purchased by the user, $Q_p^s$ is the utility obtained by the VInP for the slice s, f is a user, $K_s$ is a set of users, $w_s$ represents the service quality request level of the user, $q_{f,l}^s$ represents whether a request of the user f is carried in the path l, $y_l^s$ is bandwidth allocation on the path l, $\Theta$ is the candidate paths comprised in all the paths from the source node to the destination node, l is a path, $\varphi_i(p_i^s)$ represents the price of the node i, $h_{i,l}^s$ represents whether the node i is used in the path, $\varphi_e(x_e^s)$ represents the price of the link e, $g_{e,l}^s$ represents whether the link e is used in the path l, $c_e^{req}$ represents the bandwidth requested by the user, $v_i^{req}$ represents the node data transmission rate requested by the user, $c_e^{pro}$ represents the remaining maximum bandwidth available for allocation that is provided by the link, $v_i^{pro}$ represents the remaining maximum data transmission rate that is able to be supported by the node, and the constraint condition comprises a constraint on the user requesting a node and link, and a constraint on the VInP responding to a node and bandwidth constraint.

8. The allocation method according to claim 1, wherein when the competitive game mechanism is used to allocate the slice resources in S6, a mutual information-based competitive game strategy is adopted, and the revenue of the user is used as a estimated value of the user for the slice, the revenue of the VInP is used as a estimated value for the slice, a estimated value a of the user for the slice is used as a random variable, a value of the slice is also a random variable p, a specific relationship exist between a and p, and I(a,p) represents a degree of correlation between the estimated value for the slice and the value of the slice.

9. The allocation method according to claim 6, wherein S5 specifically comprises:
calculating the total revenue of the slice according to the revenue of the VInP and the revenue of the user:

$$\max Q^s = \max(Q_c^s + Q_p^s) = \tag{11}$$

$$\max \sum_{f \in K_s} w_s \log\left(1 + \sum_{l \in \Theta} q_{f,l}^s y_l^s\right) - \left(\sum_{l \in \Theta} \phi_i(p_i^s)h_{i,j}^s + \sum_{l \in \Theta} \phi_e(x_e^s)g_{e,l}^s\right)r,$$

$$\text{s.t.:} \quad x_e^s \geq c_e^{req}, \; p_i^s \geq v_i^{req}, \; x_e^s \leq c_e^{pro}, \; p_i^s \leq v_i^{pro},$$

wherein $Q_c^s$ represents the revenue from the slice s purchased by the user, $Q_p^s$ is the utility obtained by the VInP for the slice s, f is a user, $K_s$ is a set of users, $w_s$ represents the service quality request level of the user, $q_{f,l}^s$ represents whether a request of the user f is carried in the path l, $y_l^s$ is bandwidth allocation on the path l, $\Theta$ is the candidate paths comprised in all the paths from the source node to the destination node, l is a path, $\varphi_i(p_i^s)$ represents the price of the node i, $h_{i,l}^s$ represents whether the node i is used in the path, $\varphi_e(x_e^s)$ represents the price of the link e, $g_{e,l}^s$ represents whether the link e is used in the path l, $c_e^{req}$ represents the bandwidth requested by the user, $v_i^{req}$ represents the node data transmission rate requested by the user, $c_e^{pro}$ represents the remaining maximum bandwidth available for allocation that is provided by the link, $v_i^{pro}$ represents the remaining maximum data transmission rate that is able to be supported by the node, and the constraint condition comprises a constraint on the user requesting a node and link, and a constraint on the VInP responding to a node and bandwidth constraint.

* * * * *